United States Patent
Lee

(10) Patent No.: US 10,549,596 B2
(45) Date of Patent: Feb. 4, 2020

(54) COUPLED TORSION BEAM AXLE FOR BUCKLING INDUCTION AND VEHICLE HAVING THE SAME

(71) Applicants: Hyundai Motor Company, Seoul (KR); Kia Motors Corporation, Seoul (KR)

(72) Inventor: Ghi-Youn Lee, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 130 days.

(21) Appl. No.: 15/837,887

(22) Filed: Dec. 11, 2017

(65) Prior Publication Data
US 2019/0001784 A1    Jan. 3, 2019

(30) Foreign Application Priority Data
Jun. 28, 2017  (KR) .......................... 10-2017-0081793

(51) Int. Cl.
*B60G 21/05* (2006.01)
*B60B 35/04* (2006.01)

(52) U.S. Cl.
CPC ............ *B60G 21/051* (2013.01); *B60B 35/04* (2013.01); *B60G 2200/21* (2013.01); *B60G 2206/016* (2013.01); *B60G 2206/20* (2013.01)

(58) Field of Classification Search
CPC ............ B60G 21/051; B60G 2206/20; B60G 2206/016; B60G 2200/21; B60B 35/04
USPC ..... 280/124.106, 124.107, 124.116, 124.128
See application file for complete search history.

(56) References Cited

U.S. PATENT DOCUMENTS

| | | | | |
|---|---|---|---|---|
| 5,520,407 A | * | 5/1996 | Alatalo | B60G 21/051 228/144 |
| 6,616,157 B2 | * | 9/2003 | Christophliemke | B60G 7/001 267/273 |
| 7,478,820 B2 | | 1/2009 | Murata | |
| 8,205,898 B2 | * | 6/2012 | Toepker | B60B 35/02 280/124.106 |
| 8,585,067 B2 | * | 11/2013 | Zhang | B60G 21/051 280/124.116 |
| 9,573,436 B2 | * | 2/2017 | Kawachi | B60G 21/051 |
| 10,315,484 B2 | * | 6/2019 | Chelikani | B60G 21/052 |
| 2007/0069496 A1 | | 3/2007 | Rinehart et al. | |
| 2010/0009114 A1 | * | 1/2010 | Kim | B21D 35/00 428/99 |
| 2013/0214504 A1 | * | 8/2013 | Ohdo | B60G 21/051 280/124.106 |

(Continued)

FOREIGN PATENT DOCUMENTS

| | | |
|---|---|---|
| JP | 2000094917 A | 4/2000 |
| JP | 2011046232 A | 3/2011 |
| KR | 20120107934 A | 10/2012 |

*Primary Examiner* — Toan C To
(74) *Attorney, Agent, or Firm* — Morgan, Lewis & Bockius LLP

(57) ABSTRACT

A coupled torsion beam axle for buckling induction may include a torsion beam, a cross section of which varies laterally, a right axle coupler and a left axle coupler being respectively formed at both end portions of the torsion beam, the torsion beam being provided with a buckling induction member configured to induce buckling deformation by an external load applied to each of the right and left axle couplers.

12 Claims, 6 Drawing Sheets

(56) References Cited

U.S. PATENT DOCUMENTS

2016/0068035 A1\* 3/2016 Rao ................... B60G 21/051
                                                280/124.166
2017/0197487 A1\* 7/2017 Langworthy ........... B60B 35/00
2018/0229575 A1\* 8/2018 Chelikani ............ B60G 21/051

\* cited by examiner

COUPLED TORSION BEAM AXLE FOR BUCKLING INDUCTION AND VEHICLE HAVING THE SAME

CROSS-REFERENCE(S) TO RELATED APPLICATIONS

The present application claims priority to Korean Patent Application No. 10-2017-0081793, filed on Jun. 28, 2017, the entire contents of which is incorporated herein for all purposes by this reference.

BACKGROUND OF THE INVENTION

Field of the Invention

The present invention relates to a coupled torsion beam axle, and more particularly, the present invention are directed to providing a vehicle having a coupled torsion beam axle configured for preventing rollover of a vehicle by inducing buckling in an event of an accident.

Description of Related Art

In general, a coupled torsion beam axle (hereinafter, referred to as "CTBA") is a type of suspension system and includes a torsion beam as a main component, wherein trailing arms are coupled to both left and right sides of the torsion beam.

The torsion beam may be manufacture as a V-section or U-section beam by press molding to have an open section structure (i.e., open structure), or may be manufactured as a tubular beam by forming a steel pipe to have a closed section structure. The tubular beam is advantageous in that it can significantly reduce a weight compared to the V beam or the U beam and can exhibit a high roll stiffness and buckling strength.

Therefore, the CTBA may increase suspension performance by a reduction in weight and the high roll stiffness provided in the V or U beam and the tubular beam, and thus may improve vehicle performance together.

However, considering that the CTBA must also satisfy stability in the event of a vehicle accident, the tubular beam may cause a side effect due to high buckling strength.

By way of example, there is a vehicle accident in which a large load is laterally applied to a wheel. In the present case, each of the U and V beams has an open structure at a lower end portion thereof to cause buckling deformation at both left and right sides connected to the trailing arms. Thus, the deformation of the CTBA due to the buckling deformation may prevent damage of the axle portion of the wheel (e.g., rear wheel), bringing only a deformation of wheel alignment wherein the vehicle can travel to some extent after the accident. On the other hand, since the tubular beam has high buckling strength due to a closed section structure, the tubular beam does not cause buckling deformation in the same condition as the U and V beams. Hence, the axle portion of the wheel may be damaged or broken, and as a result, the vehicle may overturn due to separation of the wheel (e.g., rear wheel).

The information disclosed in this Background of the Invention section is only for enhancement of understanding of the general background of the invention and should not be taken as an acknowledgment or any form of suggestion that this information forms the prior art already known to a person skilled in the art.

BRIEF SUMMARY

Various aspects of the present invention are directed to providing a coupled torsion beam axle for buckling induction, configured for maintaining a vehicle in a travelable state by preventing separation of wheels through induction of buckling deformation of a torsion beam to prevent damage or breaking an axle portion of each wheel even though a large lateral load is applied thereto, and of forming local weak stiffness portions in section by beads in planar sections wherein the buckling deformation of the torsion beam occurs at positions close to the axle portions of the left and right wheels, and a vehicle having the same.

Other various aspects of the present invention can be understood by the following description, and become apparent with reference to the exemplary embodiments of the present invention. Also, it is obvious to those skilled in the art to which the present invention pertains that the objects and advantages of the present invention can be realized by the means as claimed and combinations thereof.

In accordance with various exemplary embodiments of the present invention, a coupled torsion beam axle may include a torsion beam, a cross section of which varies laterally, a right axle coupler and a left axle coupler being respectively formed at both end portions of the torsion beam, the torsion beam being provided with a buckling induction member configured to induce buckling deformation by an external load applied to each of the right and left axle couplers, and a trailing arm including a right trailing arm coupled to the right axle coupler and a left trailing arm coupled to the left axle coupler.

The buckling induction member may cause the buckling deformation by bending the torsion beam at an acute angle, and the torsion beam may be bent in a diagonal direction thereof.

The buckling induction member may include an upper-end portion bead which is formed on an upper surface of the torsion beam and may include front and rear upper-end portion beads, and a rear lower-end portion bead formed on a lower surface thereof. The buckling induction member may form a local weak stiffness portion in section in each of the right and left axle couplers. The upper-end portion bead and the rear lower-end portion bead may have a same shape and may be positioned at an interval to form the diagonal direction thereof.

Alternatively, the buckling induction member may include an upper-end portion bead formed on an upper surface of the torsion beam and rear and front lower-end portion beads formed on a lower surface thereof. The buckling induction member may form a local weak stiffness portion in section in each of the right and left axle couplers.

In accordance with various exemplary embodiments of the present invention, a vehicle may include a coupled torsion beam axle for buckling induction including a torsion beam, a cross section of which varies laterally, a right axle coupler and a left axle coupler being respectively formed at both end portions of the torsion beam, a trailing arm including left and right trailing arms coupled to the respective left and right axle couplers, and a buckling induction member configured to induce buckling deformation by an external load applied to each of the right and left axle couplers, and a rear wheel including right and left rear wheels coupled to the coupled torsion beam axle for buckling induction.

The buckling induction member may induce the buckling deformation that allows the torsion beam to be bent in a rearward diagonal direction thereof with a wheel input moment generated by a large lateral load applied to one of the right and left rear wheels.

The torsion beam may be bent in the diagonal direction by a bead which is formed in the torsion beam by perforations or is a recessed groove formed therein.

Figure 1:
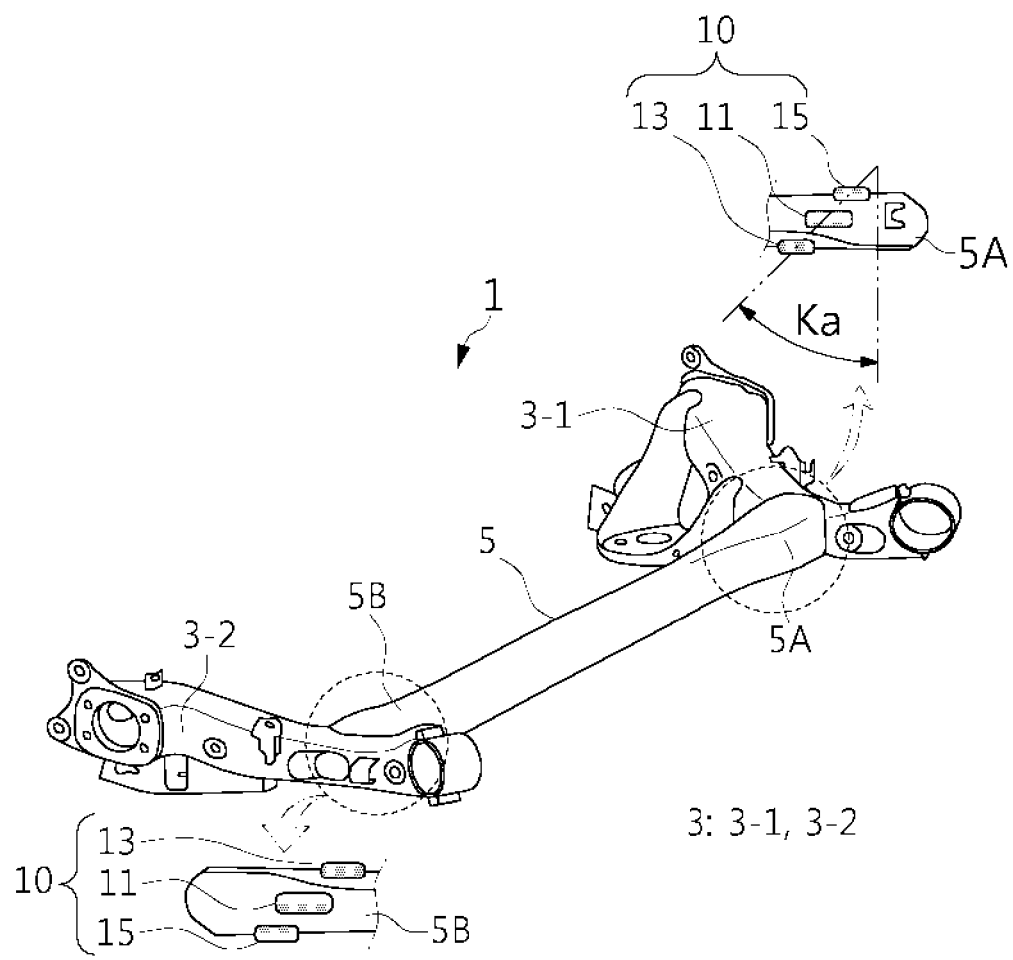
FIG. 1 is a view illustrating a configuration of a coupled torsion beam axle for buckling induction according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientation, locations, and shapes will be determined in portion by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, a coupled torsion beam axle 1 includes a trailing arm 3, a torsion beam 5, and a buckling induction member 10.

More specifically, the trailing arm 3 includes a right trailing arm 3-1 and a left trailing arm 3-2, and controls forces applied in forward-rearward and upward-downward directions. The right trailing arm 3-1 is welded to an end portion of a right axle coupler 5A of the torsion beam 5, and the left trailing arm 3-2 is welded to an end portion of a left axle coupler 5B of the torsion beam 5.

The torsion beam 5 has an effective section length against torsion controlling a roll, and the respective right and left axle couplers 5A and 5B are formed at both end portions of the torsion beam 5. The right axle coupler 5A is welded to the right trailing arm 3-1, and the left axle coupler 5B is welded to the left trailing arm 3-2.

The buckling induction member 10 forms a local weak stiffness portion in section at the torsion beam 5 to induce buckling deformation in the torsion beam by a large lateral load. The buckling deformation prevents damage or breaking of a wheel axle portion formed between the trailing arm 3 and the torsion beam 5, and prevents a vehicle from stopping due to separation of wheels. To this end, the buckling induction member 10 has a structure in which a bead is formed in a flat section formed in each of the right and left axle couplers 5A and 5B of the torsion beam 5.

For example, the bead includes an upper bead and a lower bead. The upper bead is formed as an upper-end portion bead 11 and the lower bead is divided into a rear lower-end portion bead 13 and a front lower-end portion bead 15. The upper-end portion bead 11 and the rear and front lower-end portion beads 13 and 15 are formed in each of the right and left axle couplers 5A and 5B in a same manner. The bead may include the upper-end portion bead 11 and the rear lower-end portion bead 13, include the upper-end portion bead 11 and the front lower-end portion bead 15, include of the upper-end portion bead 11, the rear lower-end portion bead 13, and the front lower-end bead portion 15. The present configurations are to minimize an influence on the overall stiffness of the torsion beam 5 due to the local weak stiffness by the bead.

In the layout, on the basis of a distance between the upper-end portion bead 11 and the end portion of the right or left axle coupler 5A or 5B, the rear lower-end portion bead 13 has a longer distance and positioned in front of the upper-end portion bead 11, and the front lower-end portion bead 15 has a shorter distance and positioned behind the upper-end portion bead 11. Here, the term "in front of" signifies a direction away from the right or left trailing arm 3-1 or 3-2 and the term "behind" signifies a direction close to the right or left trailing arm 3-1 or 3-2.

Therefore, in the layout, the upper-end portion bead 11 forms an imaginary diagonal line connected to each of the rear and front lower-end portion beads 13 and 15 at an acute angle (Ka).

Figures 2A, 2B:
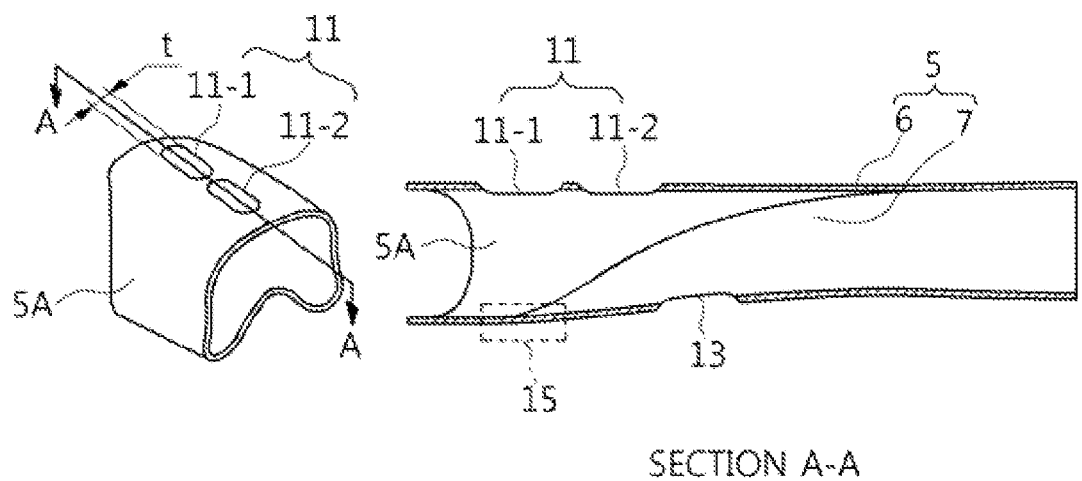
FIG. 2A and FIG. 2B are detailed views of a buckling induction member applied to a torsion beam according to an exemplary embodiment of the present invention.

FIG. 2A and FIG. 2B illustrate a section structure of the rear and front lower-end portion beads 13 and 15 for the upper-end portion bead 11. As illustrated in the drawings, the torsion beam 5 forms a bending line 7 inwardly of a beam body 6 in a longitudinal section. The bending line 7 is connected from the right trailing arm 3-1 to the left trailing arm 3-2 along the beam body 6 to form a closed section except the right and left axle couplers 5A and 5B of the torsion beam 5. Therefore, the rear lower-end portion bead 13 is positioned behind the bending line 7, whereas the front lower-end portion bead 15 is positioned in front of the bending line 7. Furthermore, the upper-end portion bead 11 is positioned in front of the bending line 7.

Especially, the upper-end portion bead 11 includes a front upper-end portion bead 11-1 and a rear upper-end portion bead 11-2. Although the front and rear upper-end portion beads 11-1 and 11-2 has a same width (t), a same length, and a same shape the present invention is not limited thereto. In various exemplary embodiments, beads 11-1 and 11-2 may have different widths, lengths, and shapes when necessary.

Furthermore, each of the upper-end portion bead 11 and the rear and front lower-end portion beads 13 and 15 may be formed in the beam body 6 by perforating or recessing device. Although each of the upper-end portion bead 11 and the rear and front lower-end portion beads 13 and 15 are illustrated to have a slot shape, the beads may have various shapes including rectangular or circular shapes.

Figure 3:
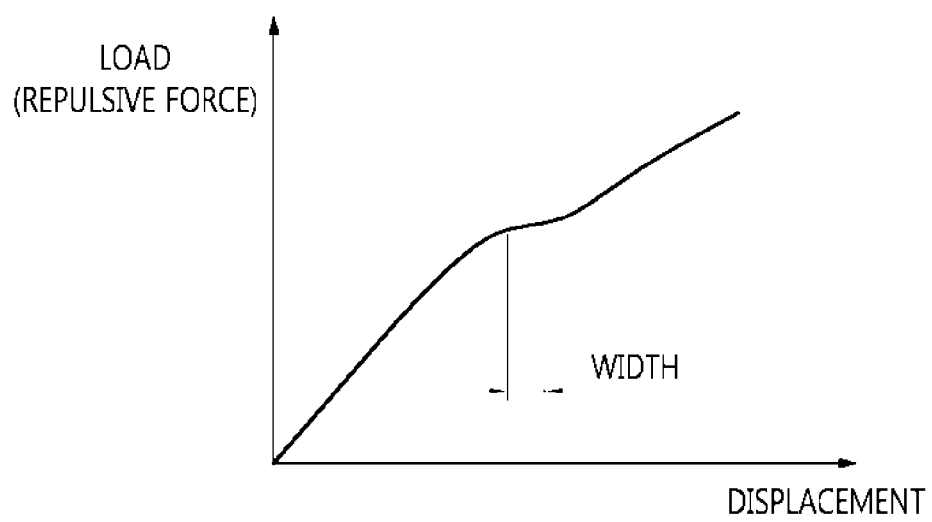
FIG. 3 is an example of a load-displacement diagram illustrating an application principle of the buckling induction member according to an exemplary embodiment of the present invention.

FIG. 3 illustrates a load-displacement diagram of the torsion beam 5 to the width (t) of each of the upper-end portion bead 11 (or the front and rear upper-end portions beads 11-1 and 11-2) and the rear and front lower-end portion beads 13 and 15. As illustrated in the drawing, the width in the load-displacement diagram illustrates a specific section that allows buckling deformation in a region of normal elastic deformation when exposed to external shocks, and the provided width is used to determine a maximum limit value of the bead in which the buckling deformation occurs within the normal elastic deformation of the torsion beam 5. Therefore, the respective widths (t) of the upper-end portion bead 11 (or the front and rear upper-end portion beads 11-1 and 11-2) and the rear and front lower-end portion beads 13 and 15 are configured to differ from each other according to the elastic characteristics of the torsion beam 5.

Figure 4:
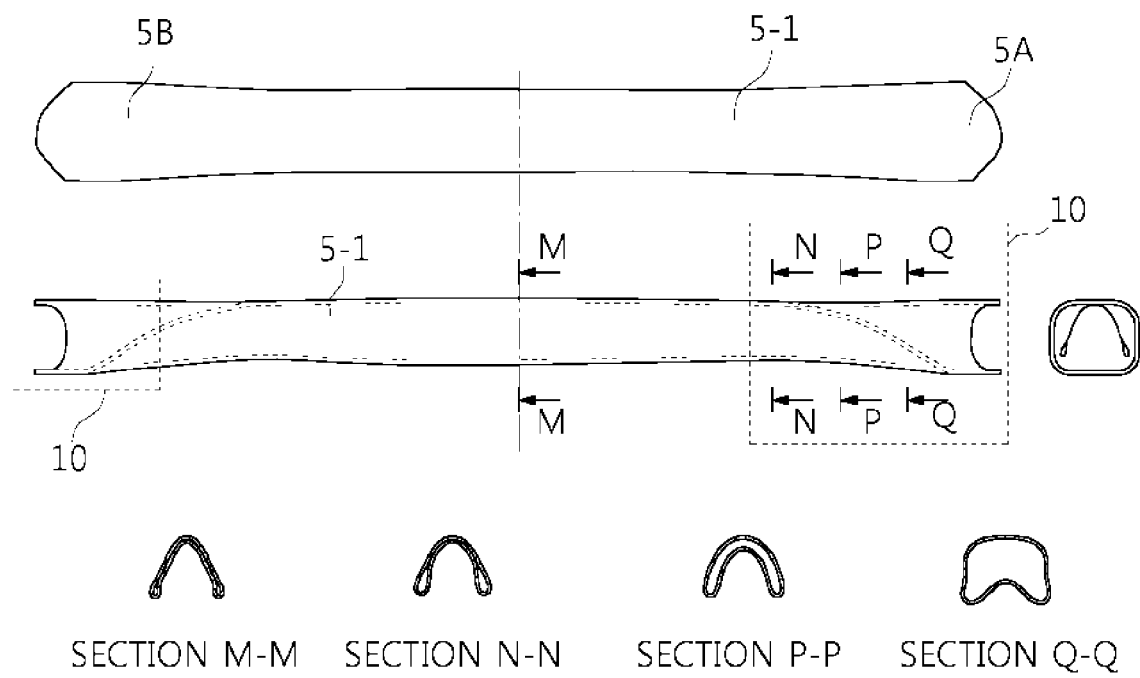
FIG. 4 is an example in which the torsion beam having the buckling induction member is formed as a tubular beam according to an exemplary embodiment of the present invention.

FIG. 4 illustrates that the torsion beam 5 is manufactured as a tubular beam 5-1. As illustrated in the drawing, the tubular beam 5-1 is manufactured by forming a steel pipe to have a closed section structure. The tubular beam 5-1 forms different closed sections in the longitudinal direction thereof. Therefore, right and left axle couplers 5A and 5B are formed at both right and left end portions of the tubular beam 5-1, and a buckling induction member 10, which has an upper-end portion bead 11 (or front and rear upper-end portion beads 11-1 and 11-2) and rear and front lower-end portion beads 13 and 15, is formed in each of the right and left axle couplers 5A and 5B.

However, the buckling induction member 10, which has the upper-end portion bead 11 (or the front and rear upper-end portion beads 11-1 and 11-2) and the rear and front lower-end portions beads 13 and 15, may be applied to a V- or U-sectional torsion beam formed by press molding to have an open section structure in the same manner. In the present case, the V- or U-sectional torsion beam is manufactured to have a higher stiffness in consideration of the buckling induction member 10.

Figure 5:
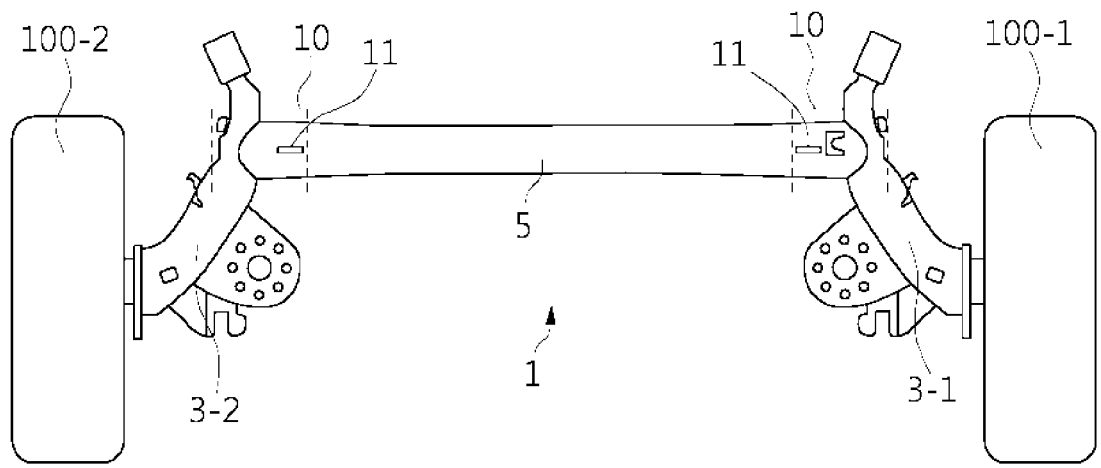
FIG. 5 is an example of a vehicle having the coupled torsion beam axle for buckling induction according to an exemplary embodiment of the present invention.

FIG. 5 illustrates an example of a vehicle 100, right and left rear wheels 100-1 and 100-2 which are mounted to a coupled torsion beam axle 1. As illustrated in the drawing, the coupled torsion beam axle 1 may include a trailing arm that may include the right trailing arm 3-1 and the left trailing arm 3-2, the torsion beam 5 that forms right and left axle couplers welded to the respective right and left trailing arms 3-1 and 3-2, and the buckling induction member 10 having the upper-end portion bead 11 formed in each of the right and left axle couplers of the torsion beam 5. In the present case, the buckling induction member 10 includes the upper-end portion bead 11 (or front and rear upper-end portion beads 11-1 and 11-2) and rear and front lower-end portion beads 13 and 15, as illustrated in FIG. 1, FIG. 2, FIG. 3, and FIG. 4.

Figure 6:
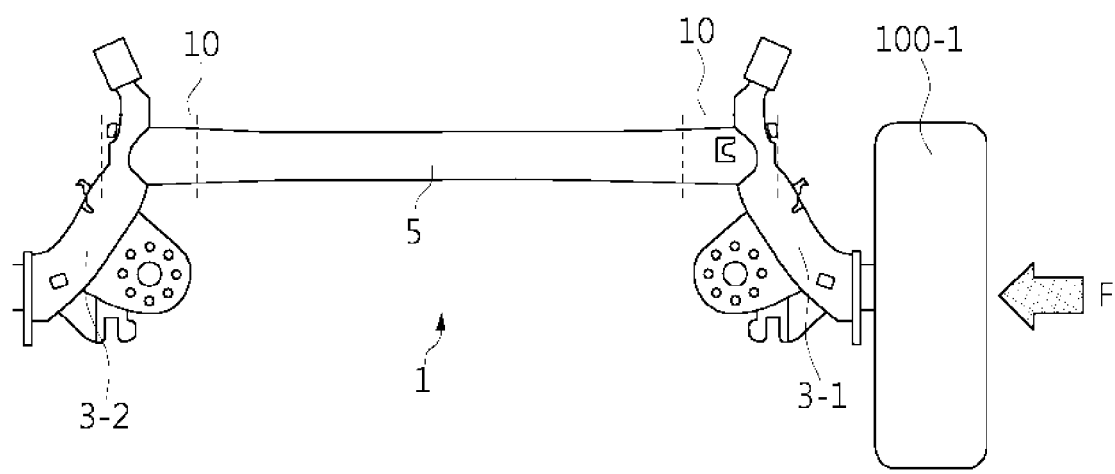
FIG. 6 is a view illustrating a state in which a large lateral load is applied to a right wheel of the vehicle according to an exemplary embodiment of the present invention.
Figure 7:
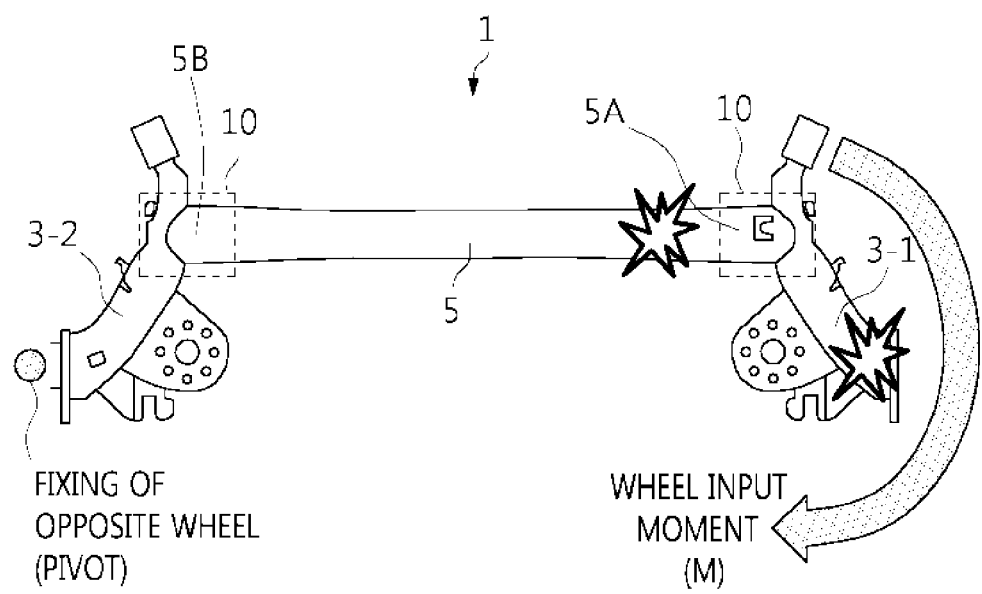
FIG. 7 is a view illustrating a state in which a large lateral load is applied to the coupled torsion beam axle for buckling induction according to an exemplary embodiment of the present invention.
Figure 8:
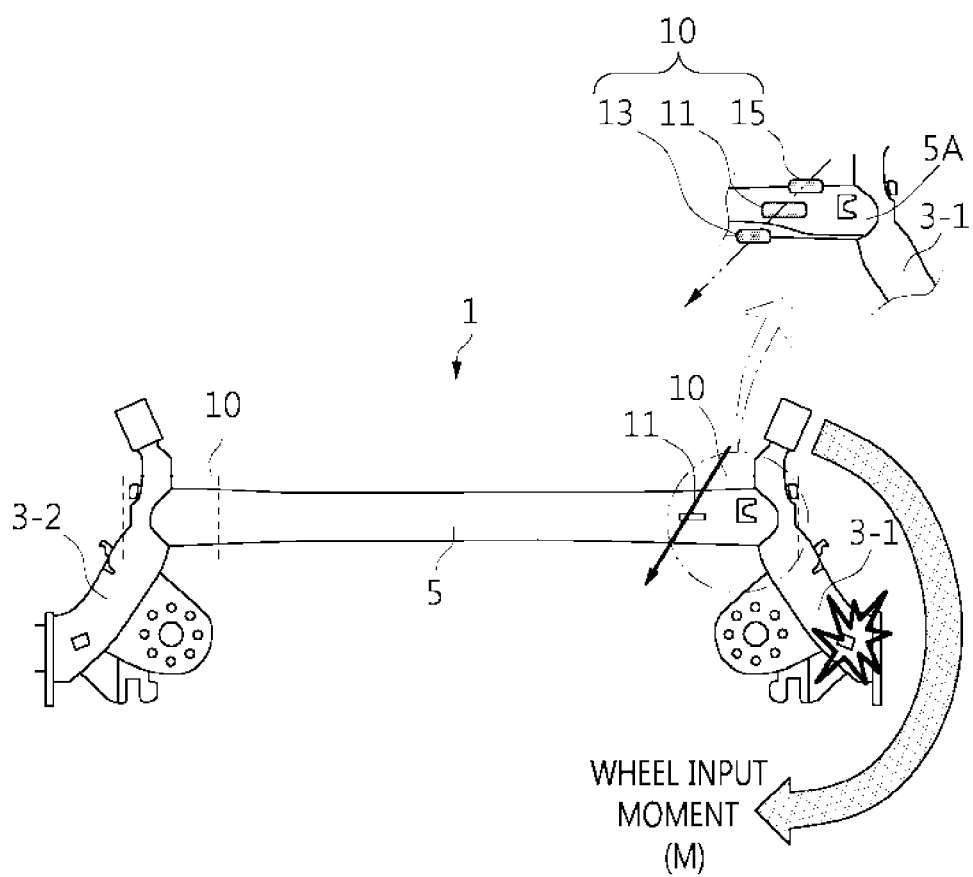
FIG. 8 is a view illustrating a state in which buckling deformation of the torsion beam is induced by the buckling induction member according to an exemplary embodiment of the present invention.

Meanwhile, FIG. 6, FIG. 7, and FIG. 8 illustrate a state in which the buckling deformation of the torsion beam 5 occurs when a large lateral load is applied to the right rear wheel 100-1 of the vehicle 100.

Referring to FIG. 6 and FIG. 7, when a large lateral load (F) is applied to the right rear wheel 100-1, the left trailing arm 3-2 of the coupled torsion beam axle 1 acts as a pivot by fixing the left rear wheel 100-2, whereas the right trailing arm 3-1 forms a wheel input moment (M). As a result, the wheel input moment (M) switches the large lateral load applied to the right rear wheel 100-1 into a rearward load, shocking a wheel axle portion connected to the right trailing arm 3-1 and the buckling induction member 10 of the torsion beam 5. As such, the torsion beam 5 causes buckling deformation by the buckling induction member 10, preventing damage or breaking of the wheel axle portion due to the wheel input moment (M). Consequently, it is possible to resolve a rollover risk of the vehicle 100 by preventing the separation of the right rear wheel 100-1, and to restrict the deformation of the right rear wheel 100-1 to wheel alignment deformation wherein the vehicle can still travel to some extent.

FIG. 8 illustrates that the buckling deformation of the torsion beam 5 is induced by the buckling induction member 10. As illustrated in the drawing, the buckling induction member 10 includes the upper-end portion bead 11 and rear and front lower-end portion beads 13 and 15, an imaginary diagonal line (indicated by a bold arrow) is formed at an acute angle by the rear and front lower-end portion beads 13 and 15 to the upper-end portion bead 11, and the imaginary diagonal line acts wherein the force applied to the wheel input moment (M) of the right trailing arm 3-1 is concentrated on the upper-end portion bead 11 and the rear and front lower-end portion beads 13 and 15.

As a result, the torsion beam 5 is bent in a rearward diagonal direction induced along the imaginary diagonal line, causing buckling deformation together with shock alleviation.

As described above, the coupled torsion beam axle for buckling induction applied to the vehicle according to the present exemplary embodiment includes the torsion beam 5, the cross section of which varies laterally, the trailing arm 3 coupled to the left and right axle couplers 5B and 5A of the torsion beam 5, and the buckling induction member 10 having a bead to induce buckling deformation by the external load applied to each of the left and right axle couplers 5B and 5A. Accordingly, even when a large lateral load is applied to the trailing arm 3 and the rear wheel forming the axle couplers, it is possible to prevent the damage or breaking of the wheel axle portion and to maintain the vehicle in a travelable state since the separation of the wheel is prevented by preventing the damage or breaking of the wheel axle portion.

The vehicle of the present invention has the following advantages and effects by applying a coupled torsion beam axle for buckling induction thereto.

Firstly, it is possible to resolve a rollover risk of a vehicle and a situation where the vehicle does not travel merely by buckling induction performance of a CTBA even when a large lateral load is applied to the vehicle. Secondly, since the buckling induction performance of the CTBA generates a local weak stiffness portion in section of a torsion beam by a bead formed thereon, the structural deformation of the CTBA or the torsion beam hardly occurs. Thirdly, since a tubular beam forms a limited bead at a wheel axle portion, it is possible to improve the performance of the tubular beam against a large lateral load while maintaining high buckling strength. Fourthly, since the CTBA is formed as a tubular beam, the performance of which is improved against a large lateral load, it is possible to prevent damage or breaking of the wheel axle portion as in the CTBA, to which V and U beams are applied, even in an accident of the vehicle to which a large lateral load is applied. Fifthly, it is possible to reduce the weight of the V/U beam and the tubular beam and maintain high strength as it is by forming a local bead in the torsion beam. Sixthly, the press molding of the V and U beams and the steel pipe forming of the tubular beam are hardly changed by forming only a bead in the torsion beam.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A coupled torsion beam axle for buckling induction, the coupled torsion beam axle comprising:
    a torsion beam, a cross section of which varies laterally,
    a first axle coupler and a second axle coupler being respectively formed at a first end portion and a second end portion, respectively of the torsion beam, the torsion beam being provided with a buckling induction member configured to induce buckling deformation by an external load applied to each of the first and second axle couplers,
    wherein the buckling induction member is formed as a bead, and the bead forms a local weak stiffness portion in section in each of the first and second axle couplers.

2. The coupled torsion beam axle of claim 1, wherein the buckling induction member causes the buckling deformation by bending the torsion beam, and the torsion beam is bent in a diagonal direction thereof.

3. The coupled torsion beam axle of claim 2, wherein the diagonal direction is formed at an acute angle.

4. The coupled torsion beam axle of claim 2, wherein the bead includes an upper-end portion bead formed on an upper surface of the torsion beam and a rear lower-end portion bead formed on a lower surface thereof, and the upper-end portion bead and the rear lower-end portion bead are disposed at a predetermined interval to form the diagonal direction thereof.

5. The coupled torsion beam axle of claim 4, wherein the upper-end portion bead and the rear lower-end portion bead have a same shape.

6. The coupled torsion beam axle of claim 4, wherein the upper-end portion bead includes front and rear upper-end portion beads spaced from each other.

7. The coupled torsion beam axle of claim 4, wherein the front lower-end portion bead is further formed on the lower surface of the torsion beam, and the front lower-end portion bead and the upper-end portion bead are disposed at a predetermined interval to form the diagonal direction thereof.

8. The coupled torsion beam axle of claim 1, wherein the torsion beam is coupled to a trailing arm, and the trailing arm includes a first trailing arm coupled to the first axle coupler and a second trailing arm coupled to the second axle coupler.

9. A vehicle comprising:
    the coupled torsion beam axle of the claim 1 for buckling induction;
    a first trailing arm and a second trailing arm coupled to the first and second axle couplers; and
    a rear wheel including right and left rear wheels coupled to the coupled torsion beam axle for the buckling induction.

10. The vehicle of claim 9, wherein the buckling induction member is configured to induce the buckling deformation that allows the torsion beam to be bent in a rearward diagonal direction thereof with a wheel input moment generated by a lateral load applied to one of the right and left rear wheels.

11. The vehicle of claim 10, wherein the torsion beam is bent in the diagonal direction by the bead formed thereon.

12. The vehicle of claim 11, wherein the bead is formed in the torsion beam by perforation or is a recessed groove formed therein.

* * * * *